Jan. 1, 1924
C. N. BRUHN
EGG CANDLING DEVICE
Filed Sept. 25, 1922
1,479,450
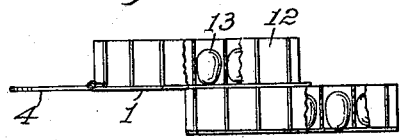
Fig. 4.
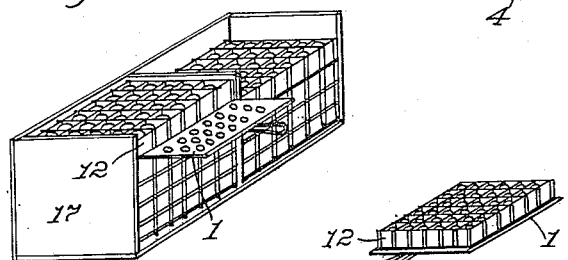
Fig. 3.
Fig. 5.
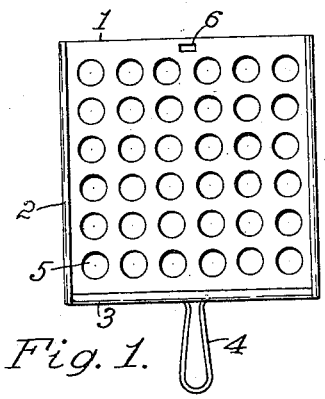
Fig. 1.
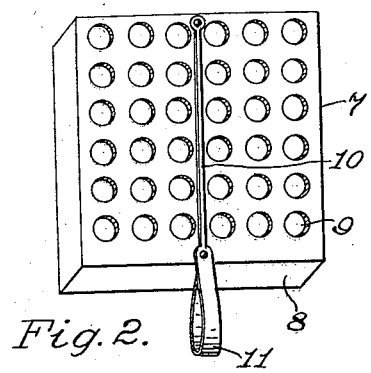
Fig. 2.
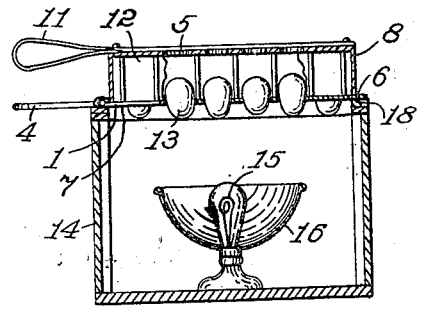
Fig. 6.
C. N. Bruhn,
By G. C. Kennedy,
Attorney Patented Jan. 1, 1924.

1,479,450

UNITED STATES PATENT OFFICE.

CHRISTIAN NESSEN BRUHN, OF CEDAR FALLS, IOWA.

EGG-CANDLING DEVICE.

Application filed September 25, 1922. Serial No. 590,441.

*To all whom it may concern:*

Be it known that I, CHRISTIAN NESSEN BRUHN, a citizen of the United States of America, and a resident of Cedar Falls, Blackhawk county, Iowa, have invented certain new and useful Improvements in Egg-Candling Devices, of which the following is a specification.

My invention relates to improvements in egg candling devices, and the object of my improvements is to supply a device for manually removing egg crate sections with contents, and adapted for convenient manipulation in being reversed in position relative to a source of illumination to permit of properly visually examining both ends of eggs in such sections.

This object I have accomplished by the means which are hereinafter described and claimed, and which are illustrated in the accompanying drawings, in which Fig. 1 is a top plan of the under member or scoop part of my combination egg-crate section handling device, and Fig. 2 is a top plan, taken in perspective, of the upper member or clamping part of the device. Fig. 3 is a perspective view, on a smaller scale, of an egg crate, showing both its top and one side removed, and the scoop part of the device in position to remove one section of the egg containers. Fig. 4 is a side elevation of the scoop and a superposed egg crate section, in removing or replacing such a section, and Fig. 5 is a perspective view of said scoop with such a section positioned thereon. Fig. 6 is a vertical cross section of the combined members of my device with an egg crate section clamped between them, and as placed over the open top of a box containing illumining means.

My device comprises the lower member 1 which may serve as a scoop when separated from the upper member 7. This scoop is a flat metal plate preferably rectangular and having a number of circular openings 5 corresponding in number to the number of cells in an egg-crate section 12 of the usual cardboard construction so as to be positioned centrally under said cells when inserted between sections, as shown in Fig. 3, which assures that when so removed the section will register with the scoop as shown in Fig. 5, with said orifices directly below the eggs in the cells. The plate 1 has a looped handle 4 for manual use, and three of its edges may be reinforced by folded over margins 2 and 3 to strengthen and stiffen it.

The associated member shown in said Fig. 2 has a top plate which is a duplicate of the plate 1 in size, shape and the openings 9 therein, and has all around its edge a depending flange 8 which may rest upon the top of said scoop, as shown in Fig. 6 in such registration that the openings 9 and 5 in both are vertically alined. The member 7 has a looped handle 11 positioned above the handle 4 so that both handles may be grasped in one hand for carrying or reversing the device when assembled.

A medial reinforcing bar 10 may be fastened across the top of said member 7 to strengthen it.

The lower member 1 may have a slot 6 in its edge part opposite the handle 4 to detachably receive an angular tongue 18 on the flange of the member 7, to serve as a hinge, and connection between said parts, to prevent relative separation or displacements when being used together.

In candling the eggs in one of the crate sections 12, after the section has been received upon the scoop 1, the member 7 may be hingedly connected to the plate 1 at 6 and 18 as above described, and the parts then assembled as shown in Fig. 6, with the flanges 8 enclosing the section, so that the openings 9 and 5 of said members are respectively at opposite ends of the eggs 13 in the cells. The device may then be deposited upon the open upper end of the closed box 14 which contains a lamp 15 with reflector 16, and the eggs viewed from above to reveal the condition of the upper ends of the eggs clearly. The device may then be inverted or reversed upon said illuminating means, to permit examination of the opposite ends of the eggs. This inspection of both ends of the eggs is necessary in order to reveal any imperfections which may lie near the ends, so that it may be determined whether they are serious or negligible in character. This assures quick handling and expert judgment as to the condition of all the eggs in a crate section.

Having described my invention, what I claim as new, and desire to secure by Letters Patent, is:

A device of the character described, comprising a flat scoop-plate having orifices therein corresponding in position to the cells of an egg-crate section to be placed thereon, and a like clamping orificed plate to be positioned thereover, having spacing means thereon to surround such a section and having means to separably connect it with said scoop-plate.

Signed at Waterloo, Iowa, this 23d day of August, 1922.

CHRISTIAN NESSEN BRUHN.